(12) United States Patent
Hsu et al.

(10) Patent No.: US 10,852,486 B2
(45) Date of Patent: Dec. 1, 2020

(54) ADAPTOR WITH BUILT-IN SHUTTER FOR OPTICAL CONNECTOR

(71) Applicant: ACON OPTICS COMMUNICATIONS INC., New Taipei (TW)

(72) Inventors: Huan-Pin Hsu, New Taipei (TW); Chih-Jen Hsiao, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 16/423,123

(22) Filed: May 27, 2019

(65) Prior Publication Data
US 2020/0003960 A1 Jan. 2, 2020

(30) Foreign Application Priority Data
Jun. 27, 2018 (TW) .............................. 107208616 U

(51) Int. Cl.
*G02B 6/38* (2006.01)
*G02B 6/42* (2006.01)

(52) U.S. Cl.
CPC .......... *G02B 6/3825* (2013.01); *G02B 6/387* (2013.01); *G02B 6/3813* (2013.01); *G02B 6/3849* (2013.01); *G02B 6/3865* (2013.01); *G02B 6/3893* (2013.01); *G02B 6/3847* (2013.01); *G02B 2006/4297* (2013.01)

(58) Field of Classification Search
CPC .. G02B 6/3813; G02B 6/3849; G02B 6/3825; G02B 6/3865; G02B 6/3869; G02B 6/387; G02B 6/3893; G02B 6/4296

USPC ....................................................... 385/53–87
See application file for complete search history.

(56) References Cited

U.S. PATENT DOCUMENTS

| | | | |
|---|---|---|---|
| 6,352,375 B1 | 3/2002 | Shimoji et al. | |
| 7,785,018 B2 * | 8/2010 | Jones | G02B 6/3849 |
| | | | 385/58 |
| 9,453,963 B2 | 9/2016 | Sato | |
| 2008/0013148 A1 | 1/2008 | Katagiyama et al. | |
| 2009/0226141 A1 | 9/2009 | Lin et al. | |
| 2013/0084041 A1 | 4/2013 | Lin et al. | |
| 2015/0117820 A1 | 4/2015 | Lin et al. | |

OTHER PUBLICATIONS

"Search Report of Europe Counterpart Application", dated Nov. 18, 2019, p.1-p.8.

* cited by examiner

*Primary Examiner* — Michael P Mooney
(74) *Attorney, Agent, or Firm* — JCIPRNET

(57) ABSTRACT

An adaptor with a built-in shutter member for optical connector including a body, a shutter, and an elastic member is provided. The body has a receiving space. The shutter is movably assembled to the body to shield or expose the receiving space. An optical connector is suited for pushing away the shutter to enter the receiving space to be connected to the body. The shutter has a step structure such that a gap is maintained between the shutter and the optical connector. The elastic member is disposed in the body and located on a moving path of the shutter. The shutter deforms the elastic member when the optical connector pushes away the shutter, and the elastic member drives the shutter to be restored when the optical connector leaves the receiving space.

8 Claims, 9 Drawing Sheets

ADAPTOR WITH BUILT-IN SHUTTER FOR OPTICAL CONNECTOR

CROSS-REFERENCE TO RELATED APPLICATION

This application claims the priority benefit of Taiwan patent application serial no. 107208616, filed on Jun. 27, 2018. The entirety of the above-mentioned patent application is hereby incorporated by reference herein and made a part of the specification.

BACKGROUND

Technical Field

The invention relates to an adaptor for connector. More particularly, the invention relates to an adaptor with a built-in shutter member for optical connector.

Description of Related Art

In recent years, optical fibers are widely used as a transmission medium for signals owing to advantages of high bandwidth and relatively low loss. Hence, along with the expansion of optical communication network technology, popularity of wide area network such as Internet and intranet grows, and communication traffic is on the rise as well.

An optical adaptor acts as a connecting medium when optical connectors are being coupled to each other. The optical adaptor creates an enclosed environment and that the optical connectors are prevented from external interference when being connected to each other. At the same time, an operator may also be prevented from looking directly at light emitted by the optical connectors, which may cause damages to the eyes.

For instance, in an optical adaptor having a shutter disclosed by U.S. Pat. No. 9,453,963B2, after a shutter plate 11 is assembled to a connector housing 1, a bottom wall 1c is attached to the connector housing 1 to form an enclosed structure. At the same time, a recess-shaped clearance 30 is disposed on the shutter plate 11, as such, a cylindrical coupling sleeve 21 may push away the shutter plate 11 and that a ferrule 24 is prevented from being in contact with the shutter plate 11.

In this way, the purpose is achieved, but complexity of a manufacturing process is increased owing to manufacturing conditions of the components. For instance, since the recess-shaped clearance is disposed on the shutter plate and the shutter plate has a smaller size, a contour of a surface of the shutter plate, that is, a relationship between a plane of a plate and the recess-shaped clearance is required to be precisely controlled. In other words, difficulty of designing and manufacturing a molding mold is increased, and a molding process may be easily affected, and that, a yield of injection molding can not be effectively controlled and maintained.

Further, the shutter plate 11 of the invention is assembled to an opening portion 11d of the bottom wall 1c through a leaf spring 18; nevertheless, as described above, an assembly process may be difficult to perform owing to the smaller component size.

In light of the above, how to simplify manufacturing and assembly processes among the related components of the optical adaptor and maintain the effect to be achieved at the same time is an important issue in this field for those having ordinary skill in the art.

SUMMARY

The invention provides an adaptor with a built-in shutter member capable of providing a required function through a simple structure and a manufacturing process.

An adaptor with a built-in shutter member for optical connector provided by an embodiment of the invention includes a body, a shutter, and an elastic member. The body has a receiving space. The shutter is movably assembled to the body to shield or expose the receiving space. The optical connector is suited for pushing away the shutter to enter the receiving space to be connected to the body. The shutter has a step structure such that a gap is maintained between the shutter and the optical connector. The elastic member is disposed in the body and is located on a moving path of the shutter. The shutter deforms the elastic member when the optical connector pushes away the shutter, and the elastic member drives the shutter to be restored when the optical connector leaves the receiving space.

In an embodiment of the invention, a bottom of the body has a pierced portion, and a portion of the shutter and the elastic member are exposed outside the body through the pierced portion.

In an embodiment of the invention, the adaptor with a built-in shutter member further includes a base portion assembled to the body along a periphery of the pierced portion, and the elastic member is connected to the base portion.

In an embodiment of the invention, the elastic member is clamped to the base portion.

In an embodiment of the invention, the elastic member is embedded to the base portion through insert molding.

In an embodiment of the invention, each of the body and the base portion has a receiving recess, and a shaft portion of the shutter is pivoted to the receiving recess.

In an embodiment of the invention, the shutter has the shaft portion, a first plate, and a second plate, and the first plate extends from the shaft portion and is located between the shaft portion and the second plate. The first plate and the second plate are parallel to each other and feature the step structure.

In an embodiment of the invention, the shutter further includes a corner portion connected between the first plate and the second plate, and an end of the elastic member is propped against the corner portion.

In an embodiment of the invention, the optical connector has a coupling sleeve and a ferrule extending from the coupling sleeve. In a process of the optical connector moving into the receiving space, a gap is provided between the ferrule and the second plate when the coupling sleeve is propped against the first plate to push away the shutter.

In an embodiment of the invention, the body further includes a stopping portion. When the elastic member drives the shutter to be restored, the second plate is propped against the stopping portion to shield the receiving space.

To sum up, the shutter of the adaptor with a built-in shutter member is not only movable disposed in the body but also has the step structure. Moreover, the elastic member is disposed in the body and is located on the moving path of the shutter. Accordingly, when the optical connector pushes away the shutter to enter the receiving space, a gap is maintained between the optical connector and the shutter owing to the step structure. In other words, through the simplified step structure of the shutter of the adaptor with a built-in shutter member, when being moved, the optical connector and the shutter are prevented from being in contact with (propped against) each other. Complexity of manufacturing and assembling the shutter may also be effectively reduced through the step structure, which is beneficial to the manufacturing process of the adaptor with a built-in shutter member.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
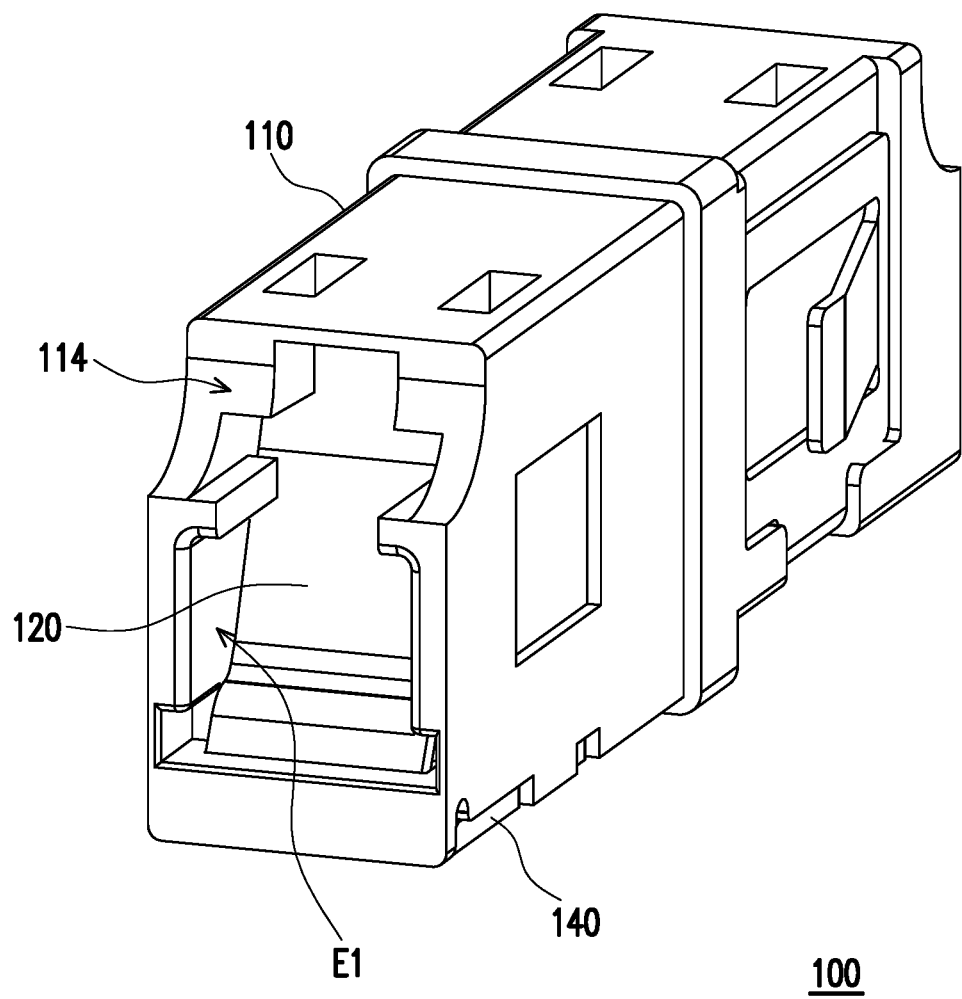
FIG. 1 is a schematic view of an adaptor with a built-in shutter member according to an embodiment of the invention.
Figure 2:
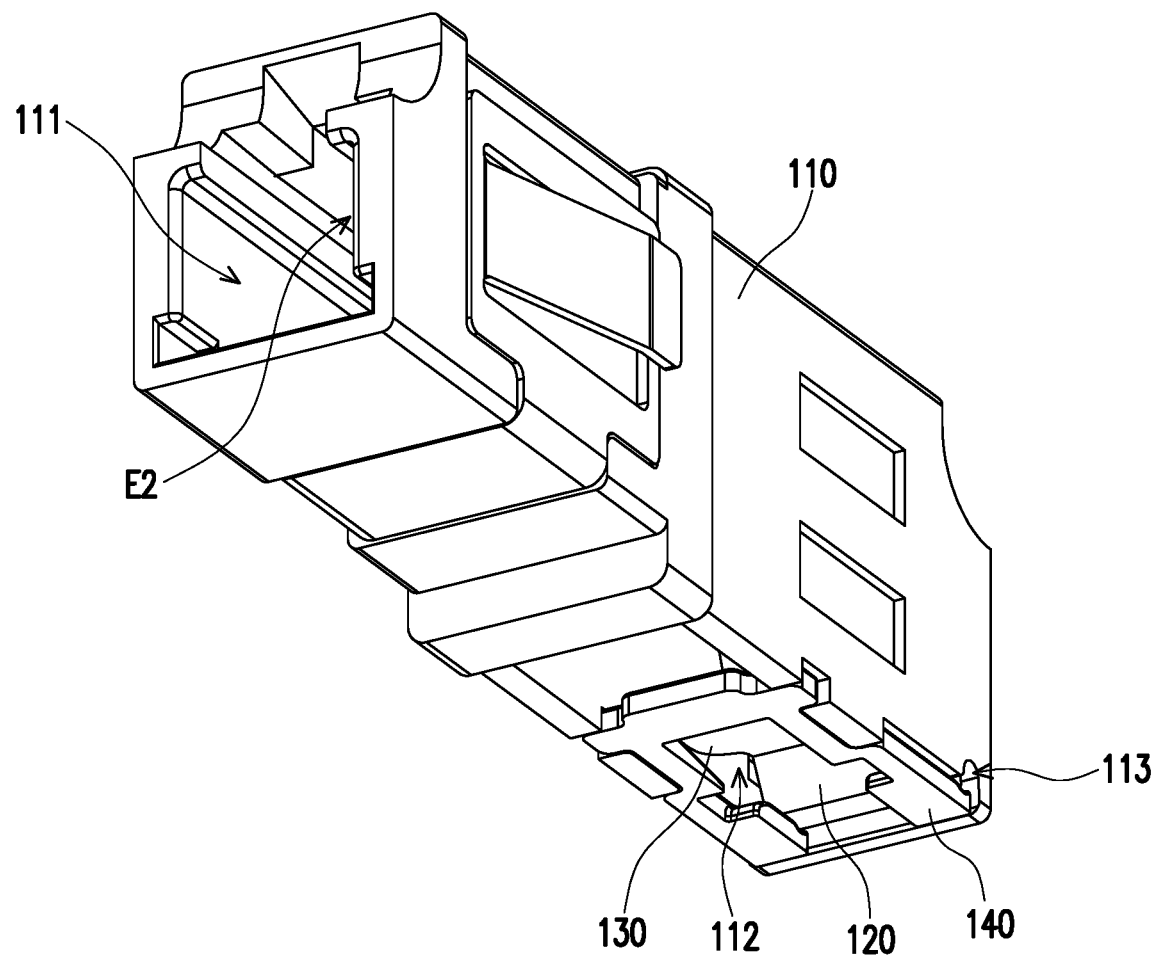
FIG. 2 is a schematic view of the adaptor with a built-in shutter member of FIG. 1 from another view angle.
Figure 3:
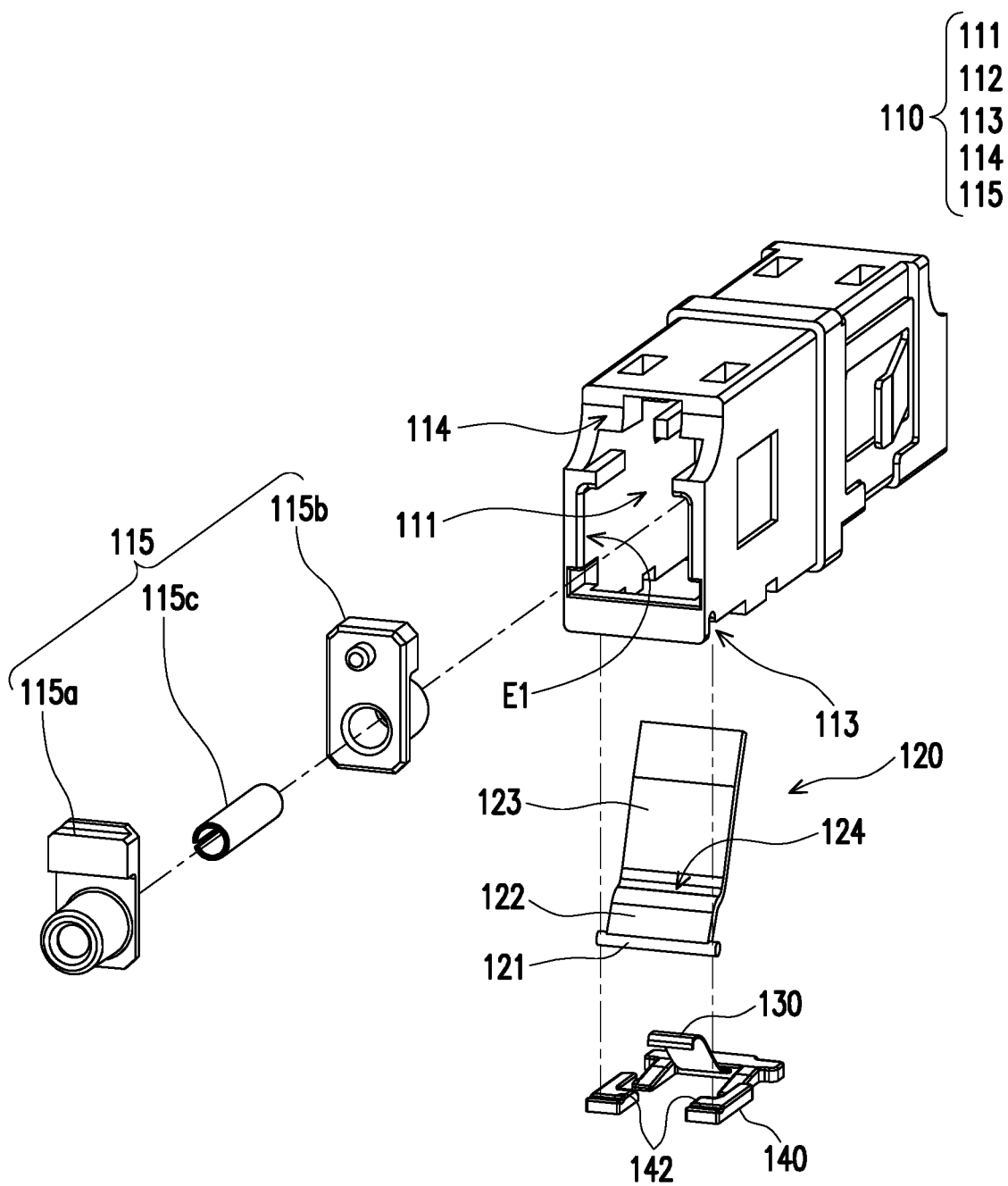
FIG. 3 and FIG. 4 are exploded views illustrating the adaptor with a built-in shutter member from different view angles.
Figure 4:
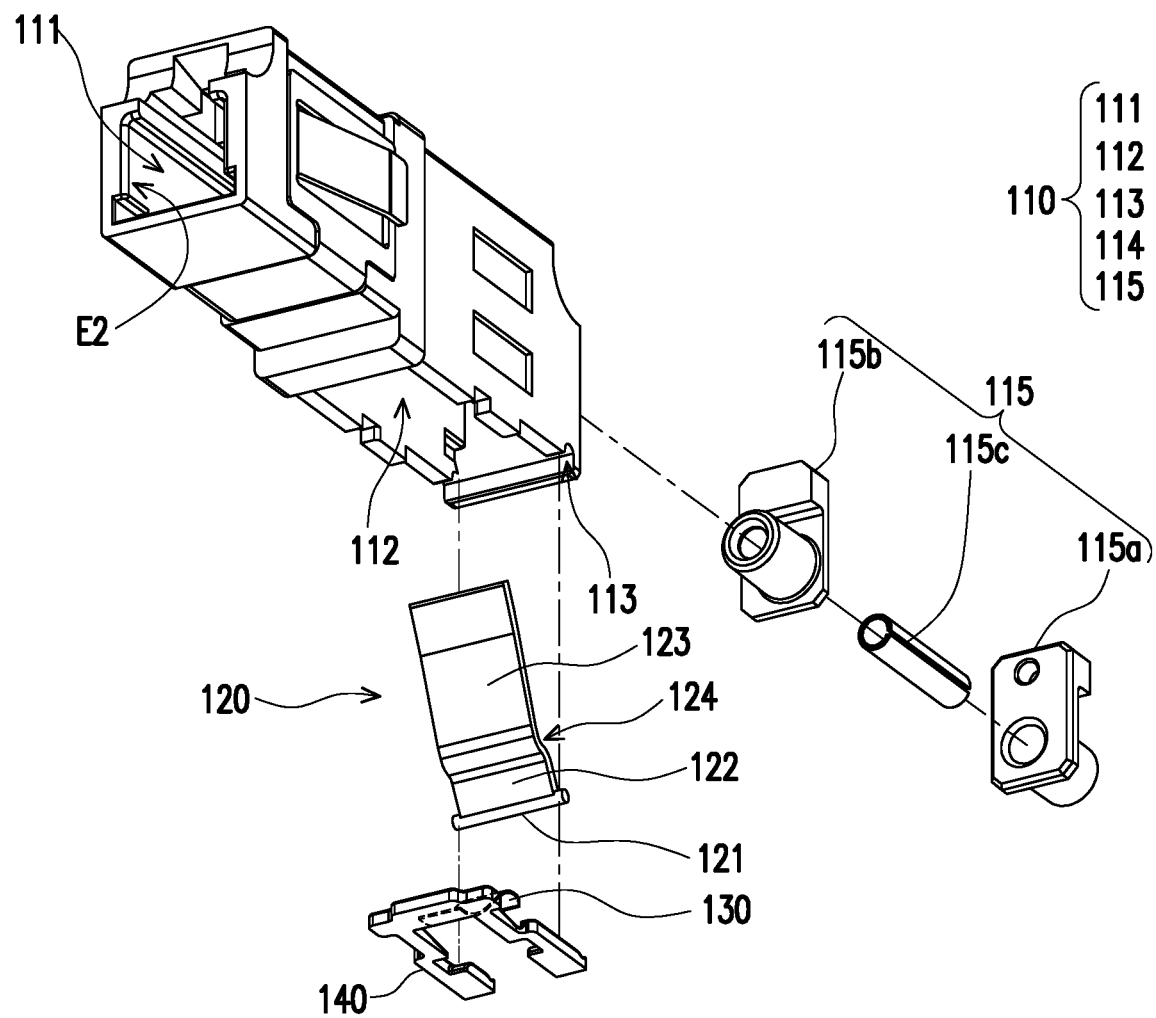

FIG. 1 is a schematic view of an adaptor with a built-in shutter member according to an embodiment of the invention. FIG. 2 is a schematic view of the adaptor with a built-in shutter member of FIG. 1 from another view angle. FIG. 3 and FIG. 4 are exploded views illustrating the adaptor with a built-in shutter member from different view angles. With reference to FIG. 1 to FIG. 4 together, in this embodiment, an adaptor with a built-in shutter member 100 for optical connector includes a body 110, a shutter 120, and an elastic member 130. The body 110 has a receiving space 111. The shutter 120 is movably assembled to the body 110 to shield or expose the receiving space 111. The elastic member 130 is disposed in the body 110 and is located on a moving path of the shutter 120.

With reference to FIG. 3 and FIG. 4 together, an optical connector 300 is suited for pushing away the shutter 120 to enter the receiving space 111 to be connected to the body 110. The shutter 120 has a step structure such that a gap is maintained between the shutter 120 and the optical connector 300. The shutter 120 deforms the elastic member 120 when the optical connector 300 pushes away the shutter 120, and the elastic member 130 drives the shutter 120 to be restored when the optical connector 300 leaves the receiving space 111.

Furthermore, the body 110 of the adaptor with a built-in shutter member 100 acts as a medium allowing optical connectors to be coupled to each other. Hence, an adapting member 115 is also disposed in the receiving space 111. The adapting member 115 includes connecting members 115*a* and 115*b* and a connecting pipe 115*c*, wherein the connecting member 115*a* faces an opening E1 of the body 110, the connecting member 115*b* faces an opening E2 of the body 110, and that the connecting pipe 115*c* is included between the connecting member 115*a* and the connecting member 115*b* when the connecting member 115*a* and the connecting member 115*b* are combined in the receiving space 111. When two optical connectors are coupled to each other, one of the optical connectors moves into the receiving space 111 through the opening E1 and is inserted in a portion of the connecting pipe 115*c* in the connecting member 115*a*, and the other optical connector moves into the receiving space 111 through the opening E2 and is inserted in another portion of the connecting pipe 115*c* in the connecting member 115*b*. Accordingly, the two optical connectors are coupled to each other in the connecting pipe 115*c*.

In addition, as shown in FIG. 2 and FIG. 4, a bottom of the body 110 has a pierced portion 112, and a portion of the shutter 120 and the elastic member 130 are exposed outside the body 110 through the pierced portion 112. Further, the adaptor with a built-in shutter member 100 further includes a base portion 140 assembled to the body 110 along a periphery of the pierced portion 112. That is, the pierced portion 112 is not completely enclosed by the base portion 140, such that the shutter 120 and the elastic member 130 can still be exposed through the pierced portion 112. Further, the body 110 has a receiving recess 113 and the base portion 140 has a receiving recess 142. As such, when the base portion 140 is assembled to the body 110, a shaft portion 121 of the shutter 120 may be pivoted to the receiving recess 113 and the receiving recess 142. Accordingly, the shutter 120 may pivot about the shaft portion 121 of the shutter 120. Moreover, as shown in FIG. 5 and FIG. 6, when the optical connector 300 moves into the receiving space 111, the optical connector 300 is able to push away the shutter 120, that is, the optical connector 300 may cause the shutter 120 to pivot.

Figure 5:
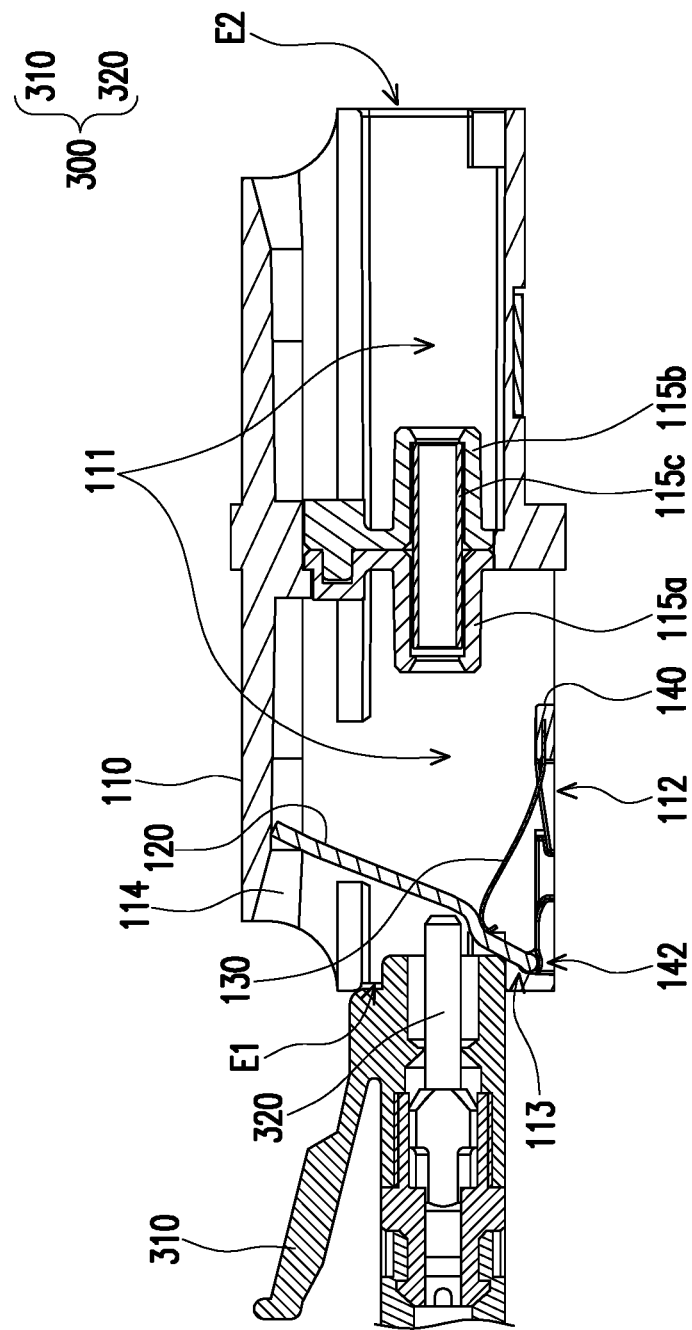
FIG. 5 to FIG. 6 are schematic cross-sectional views of the adaptor with a built-in shutter member in different states.
Figure 6:
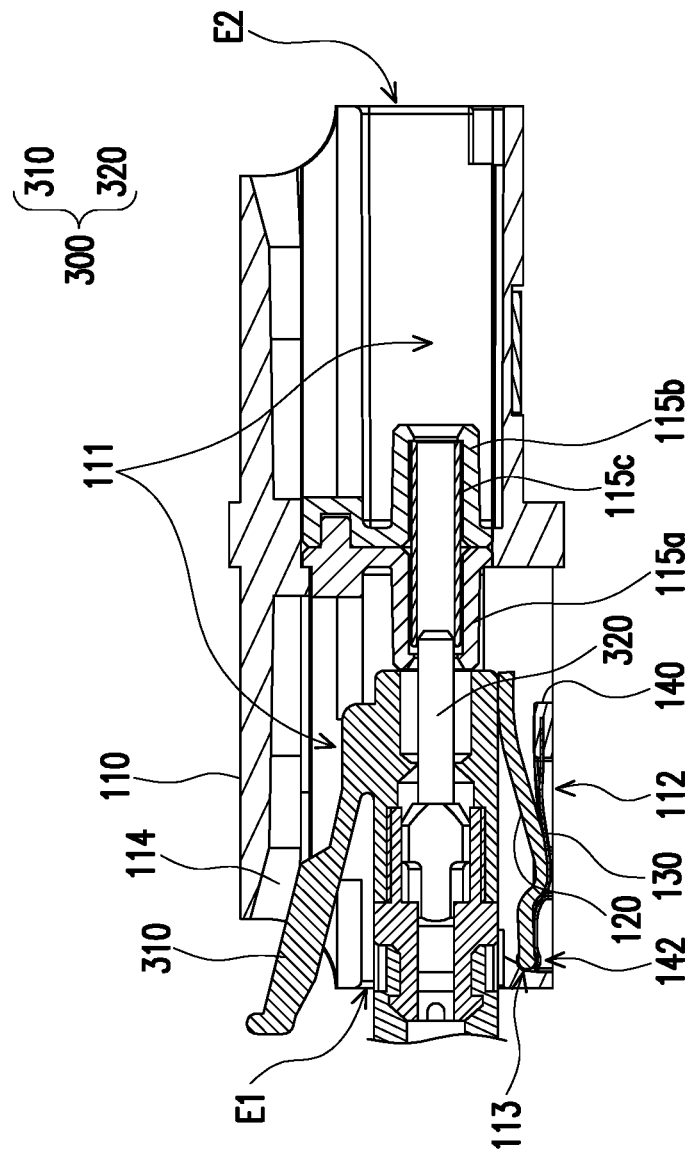

With reference to FIG. 3 to FIG. 6, in this embodiment, the shutter 120 has a first plate 122, a corner portion 124, a second plate 123, and the shaft portion 121, wherein the first plate 122 extends from the shaft portion 121 and is located between the shaft portion 121 and the second plate 123. The corner portion 124 is connected between the first plate 122 and the second plate 123. Moreover, since the first plate 122 is substantially parallel to the second plate 123, the corner portion 124 causes the first plate 122 and the second plate 123 to form a step structure. That is, when one of the first plate 122 and the second plate 123 parallel to each other acts as a base reference, a height difference may be regarded to be provided between the base reference and the other plate. In addition, the elastic member 130, for example, is an elastic member being embedded to the base portion 140 through insert molding. Moreover, one end of the elastic member 130 away from the end embedded to the base portion 140 is substantially propped against the corner portion 124 of the shutter 120. Accordingly, before the optical connector 300 moves into the receiving space 111, as affected by the elastic member 130, the shutter 120 is propped against a stopping portion 114 of the body 110 and thus encloses the receiving space 111, as shown in FIG. 5. After the optical connector 300 moves into the receiving space 111, the shutter 120 is pushed away by the optical connector 300 to expose the receiving space 111, and the shutter 120 is pivoted to accordingly deform the elastic member 130, as shown in FIG. 6.

Further, the optical connector 300 has a coupling sleeve 310 and a ferrule 320 extending from the coupling sleeve 310. Moreover, in a plugging direction of the optical connector 300 with respect to the body 110, the coupling sleeve 310 corresponds to the first plate 122, and the ferrule 320 corresponds to the second plate 123. In addition, the first plate 122, the corner portion 124, and the second plate 123 of the shutter 120 form the step structure. Hence, in a process when the optical connector 300 moves into the receiving space 111, a gap is provided between the ferrule 320 and the second plate 123 when the coupling sleeve 310 is propped against the first plate 122 to push away the shutter 120. Not until the ferrule 320 is inserted into the connecting pipe 115c does the ferrule 320 be able to be in contact with the second plate 123. In this way, the ferrule 320 and the shutter 120 are prevented from being in contact with each other to pollute the ferrule 320.

On the contrary, when the optical connector 300 leaves the receiving space 111, the elastic member 130 driven and thus deformed by the shutter 120 may drive the shutter 120 to be restored through an elastic force thereof. That is, the shutter 120 is restored to a position in which the shutter 120 is propped against the stopping portion 114.

Note that since the shutter 120 is formed by the first plate 122 and the second plate 123 having the step structure, the shutter 120 provided by the invention has a relatively simple structural contour compared to the shutter provided by the prior art because a recess-shaped clearance is disposed on the shutter. Hence, in a manufacturing process of the shutter 120, that is, a mold used for molding the shutter 120 and a process of injection molding, technical complexity is improved and convenience is enhanced compared to that of the prior art. In this way, a manufacturing yield of the shutter 120 is effectively increased as well. Further, in the invention, the body 110 has the pierced portion 112, and the elastic member 130 is assembled (or embedded through insert molding) to the base portion 140 before assembling the base portion 140 to the periphery of the pierced portion 112. Nevertheless, in the prior art which adopts the assembly process in which the leaf spring is assembled between the shutter and the bottom wall, assembly difficulty is relatively high because the assembly process can be easily limited by the excessively small component sizes. On the contrary, in the invention, an assembly process of the adaptor with a built-in shutter member 100 can be effectively simplified owing to said structural feature, and thus, assembly complexity and difficulty is reduced and manufacturing efficiency and yield of the adaptor with a built-in shutter member 100 is further increased.

Figure 7:
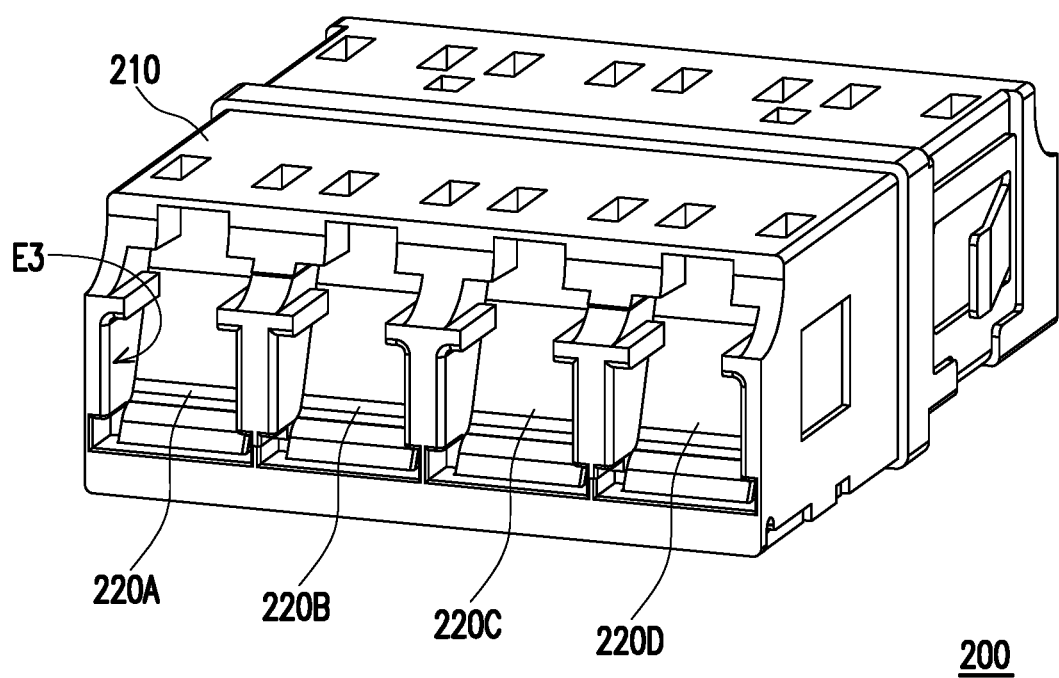
FIG. 7 and FIG. 8 are schematic views of an adaptor with a built-in shutter member from different view angles according to an embodiment of the invention.
Figure 8:
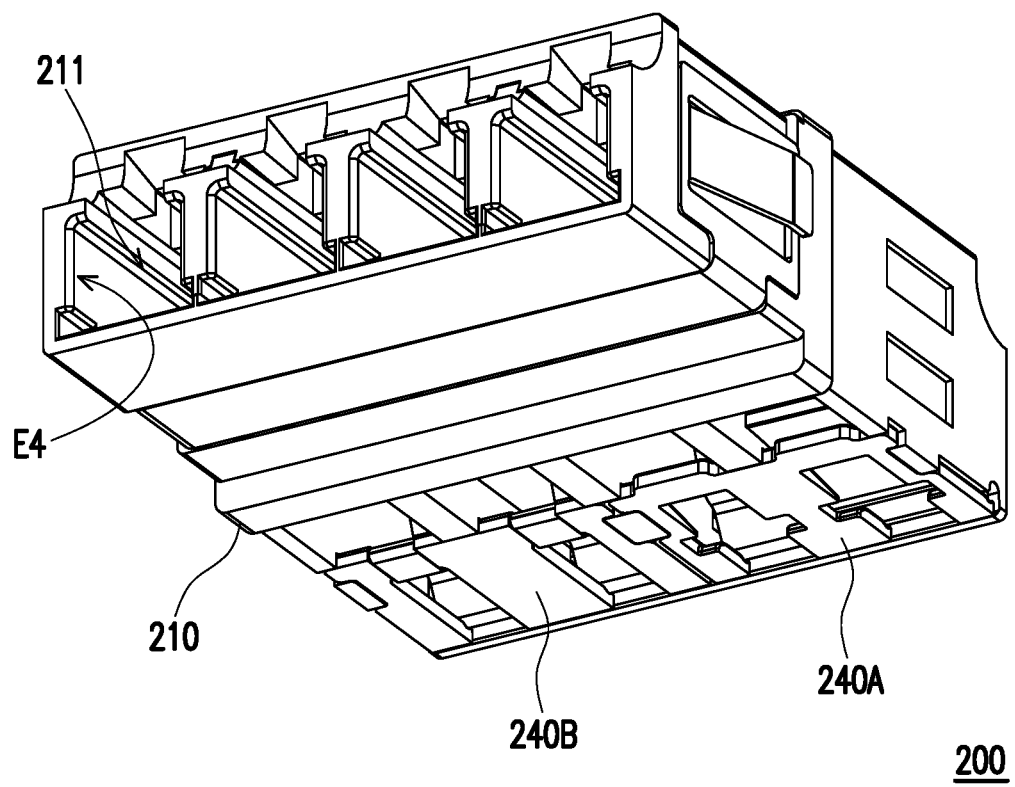
Figure 9:
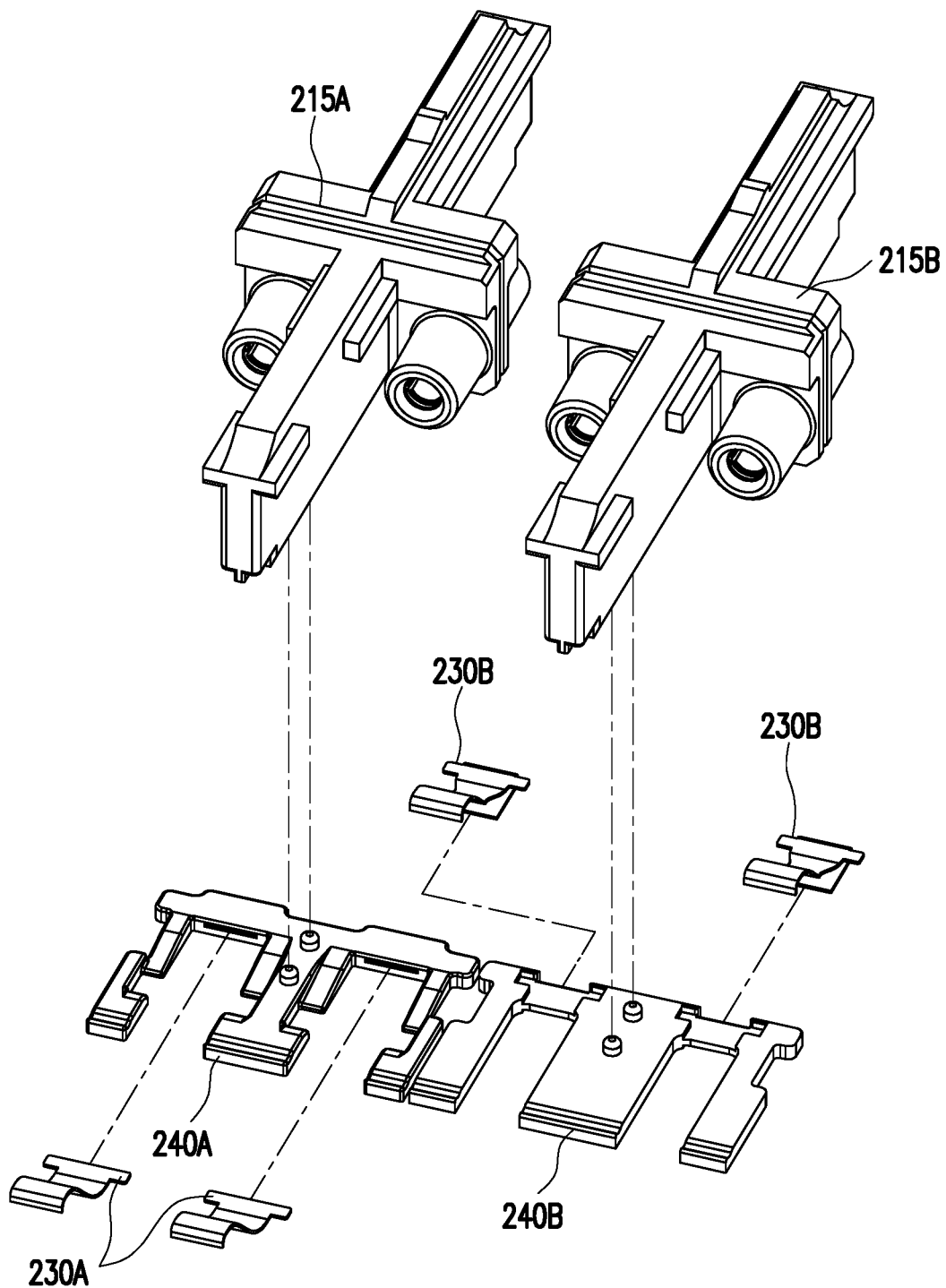
FIG. 9 is an exploded view of part of components of the adaptor with a built-in shutter member of FIG. 7.

FIG. 7 and FIG. 8 are schematic views of an adaptor with a built-in shutter member from different view angles according to an embodiment of the invention. FIG. 9 is an exploded view of part of components of the adaptor with a built-in shutter member of FIG. 7. With reference to FIG. 7 to FIG. 9 together, in this embodiment, an adaptor with a built-in shutter member 200 includes a body 210 and a plurality of shutters 220A to 220D, and the body 210 has a receiving space 211 and a plurality of opening portions E3 and E4. Hence, the adaptor with a built-in shutter member 200 of this embodiment is suited for being connected to 4 pairs of optical connectors at the same time, and a connecting structure thereof is similar to that described in the foregoing embodiment, a relevant description thereof is thus omitted.

With reference to FIG. 8 and FIG. 9, it is worth mentioning that the adaptor with a built-in shutter member 200 of this embodiment includes base portions 240A and 240B of different types and elastic members 230A and 230B of different types. The base portions 240A and 240B are respectively assembled to adapting members 215A and 215B of the body 210, and the elastic member 230A, for example, is embedded to the base portion 240A by means of insert molding, and the elastic member 230B, for example, is clamped to a rib structure of the base portion 240B.

Although the elastic members 230A and 230B and the base portions 240A and 240B are combined in different ways, a relative relationship between the elastic members 230A and 230B and the shutters 220A to 220D is identical to that described in the foregoing embodiment and is not changed. Therefore, a mean used for combining the elastic members and the base portions is not limited by the embodiments of the invention.

In view of the foregoing, in the embodiments of the invention, the shutter of the adaptor with a built-in shutter member is not only movable disposed in the body but also has the step structure. Moreover, the elastic member is disposed in the body and is located on the moving path of the shutter. Accordingly, when the optical connector pushes away the shutter to enter the receiving space, a gap is maintained between the optical connector and the shutter owing to the step structure. In other words, through the simplified step structure of the shutter of the adaptor with a built-in shutter member, when being moved, the optical connector and the shutter are prevented from being in contact with (propped against) each other. Complexity of manufacturing and assembling the shutter may also be effectively reduced through the step structure, which is beneficial to the manufacturing process of the adaptor with a built-in shutter member.

Further, since the shutter is formed by the first plate and the second plate having the step structure, the shutter provided by the invention has a relatively simple structural contour compared to the shutter provided by the prior art because a recess-shaped clearance is disposed on the shutter. Hence, in the manufacturing process of the shutter, that is, a mold used for molding the shutter and the process of injection molding, technical complexity is improved and convenience is enhanced compared to that of the prior art. In this way, the manufacturing yield of the shutter is effectively increased as well.

In addition, in the invention, the body has the pierced portion, and the elastic member is assembled (or embedded through insert molding) to the base portion before assembling the base portion to the periphery of the pierced portion. Nevertheless, in the prior art which adopts the assembly process in which the leaf spring is assembled between the shutter and the bottom wall, assembling difficulty is relatively high because the assembly process can be easily limited by excessively small component sizes. On the contrary, in the invention, the assembly process of the adaptor with a built-in shutter member can be effectively simplified owing to said structural feature, and thus, assembly complexity and difficulty is reduced and manufacturing efficiency and yield of the adaptor with a built-in shutter member is further increased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An adaptor for optical connector, comprising:
a body, having a receiving space;
a shutter, movably assembled to the body to shield or expose the receiving space, an optical connector being suited for pushing away the shutter to enter the receiving space to be connected to the body, wherein the shutter has a step structure such that a gap is maintained between the shutter and the optical connector; and an elastic member, disposed in the body and located on a moving path of the shutter, the shutter deforming the elastic member when the optical connector pushes away the shutter, and the elastic member driving the shutter to be restored when the optical connector leaves the receiving space, wherein the shutter has a shaft portion, a first plate, and a second plate, the first plate extends from the shaft portion and is located between the shaft portion and the second plate, and the first plate and the second plate are parallel to each other and feature the step structure, and the optical connector has a coupling sleeve and a ferrule extending from the coupling sleeve, and a gap is provided between the ferrule and the second plate when the coupling sleeve is propped against the first plate to push away the shutter in a process of the optical connector moving into the receiving space.

2. The adaptor as claimed in claim 1, wherein a bottom of the body has a pierced portion, and a portion of the shutter and the elastic member are exposed outside the body through the pierced portion.

3. The adaptor as claimed in claim 2, further comprising:
a base portion, assembled to the body along a periphery of the pierced portion, the elastic member being connected to the base portion.

4. The adaptor as claimed in claim 3, wherein the elastic member is clamped to the base portion.

5. The adaptor as claimed in claim 3, wherein the elastic member is embedded to the base portion through insert molding.

6. The adaptor as claimed in claim 3, wherein each of the body and the base portion has a receiving recess, and a shaft portion of the shutter is pivoted to the receiving recess.

7. The adaptor as claimed in claim 1, wherein the shutter further comprises a corner portion connected between the first plate and the second plate, and an end of the elastic member is propped against the corner portion.

8. The adaptor as claimed in claim 1, wherein the body further comprises a stopping portion, and the second plate is propped against the stopping portion to shield the receiving space when the elastic member drives the shutter to be restored.

* * * * *